United States Patent [19]
Lystad

[11] 3,888,044
[45] June 10, 1975

[54] FOLDING STABILIZER LINKAGE FOR VEHICLE WINDOW

[75] Inventor: Leonard A. Lystad, Warren, Mich.

[73] Assignee: General Motors Corporation, Detroit, Mich.

[22] Filed: Jan. 16, 1974

[21] Appl. No.: 433,752

[52] U.S. Cl.................................. 49/227; 49/375
[51] Int. Cl............................................. E05f 11/52
[58] Field of Search..................... 49/227, 348–353, 49/372, 374, 375

[56] References Cited
UNITED STATES PATENTS
3,062,528  11/1962  Martens............................... 49/227
3,591,982  7/1971  Nantau ................................ 49/227

Primary Examiner—Kenneth Downey
Attorney, Agent, or Firm—Herbert Furman

[57] ABSTRACT

A stabilizer linkage stabilizes a raised window against pitch movement about an axis perpendicular to the window. A first roller attached to the vehicle window is movable within a track mounted vertically in a vehicle door to permit movement of the window between raised and lower positions. A stabilizer linkage includes an upper stabilizer link having one of its ends pivotally attached to the window in horizontally spaced relation from the first roller. A lower stabilizer link has one of its ends connected to the other end of the upper stabilizer link and its other end pivotally connected to the track by a second roller. A spring acting between the upper stabilizer link and lower stabilizer link urges the stabilizer linkage into a normal straight line relationship in which the vertical spacing between the first and second rollers is maximized to support and stabilize the window. A cam follower on the lower stabilizer link engages a cam mounted on the track as the window is lowered causing the lower stabilizer link to pivot about the second roller so that the stabilizer linkage is folded laterally of the vehicle to permit further lowering of the first roller and the window while the second roller remains substantially stationary.

3 Claims, 6 Drawing Figures

FOLDING STABILIZER LINKAGE FOR VEHICLE WINDOW

The invention relates to a mechanism for raising and lowering a vehicle window and having a linkage for stabilizing the position of the window when in the raised position.

It is known to provide a window regulating mechanism for moving a window between a raised position closing the window opening and lowered position in which the window is stored in a storage cavity within the vehicle body. It is desirable to stabilize such a window against pitch movement about an axis perpendicular to the window, particularly when the window is in the raised position in which it must be firmly seated against a sealing strip to prevent leakage of water into the vehicle body.

It is also desirable in vehicle bodies to provide a stabilizing mechanism which permits the window to be lowered as close as possible to the bottom of the storage cavity so that maximum utilization of the storage cavity may be had and accordingly the window sill structure may be at a relatively low elevation.

Accordingly, the present invention provides a window regulating mechanism having a stabilizer linkage which stabilizes the position of the window in the raised position and then folds in half as the window is lowered so that the window may be lowered to a greater depth within the storage cavity.

According to the present invention, a first roller attached to the vehicle window is movable within a track mounted vertically in a vehicle door to permit movement of the window between raised and lowered positions. A stabilizer linkage includes an upper stabilizer link having one of its ends pivotally attached to the window in horizontally spaced relation from the first roller. A lower stabilizer link has one of its ends connected to the other end of the upper stabilizer link and its other end pivotally connected to the track by a second roller. A spring acting between the upper stabilizer link and lower stabilizer links urges the stabilizer linkage into a normal straight line relationship in which the vertical spacing between the first and second rollers is maximized to support and stabilize the window. A cam follower on the lower stabilizer link engages a cam mounted on the track as the window is lowered causing the lower stabilizer link to pivot about the second roller so that the stabilizer linkage is folded laterally of the vehicle to permit further lowering of the first roller and the window while the second roller remains substantially stationary. Thus the folding stabilizer linkage provides improved stabilization of the window in the raised position and then folds to permit substantial lowering of the window into the storage cavity.

IN THE DRAWINGS

Figure 1:
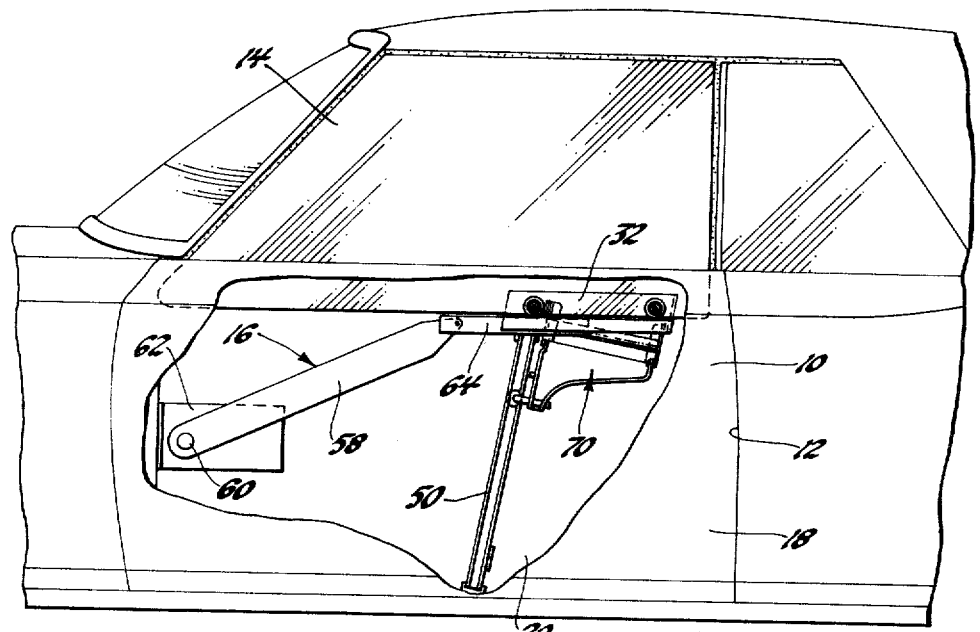
FIG. 1 is a fragmentary partially broken away side elevation view of a vehicle door embodying a window regulator and folding stabilizer linkage according to the invention, the window being shown in raised position.

Referring to FIG. 1, a vehicle body door 10 is located within a door opening 12 defined by the vehicle body. The door 10 is conventionally hinged at its forward edge to the vehicle body for swinging movement between an open position, not shown, and the closed position shown in the drawings. When the door is in the closed position, a portion of the door opening is closed by a window 14 mounted on the door 10. A window regulator assembly, generally designated 16, is mounted within the door and is operable to move the window between the raised position of FIG. 1 and the lowered position of FIG. 4.

Figure 3:
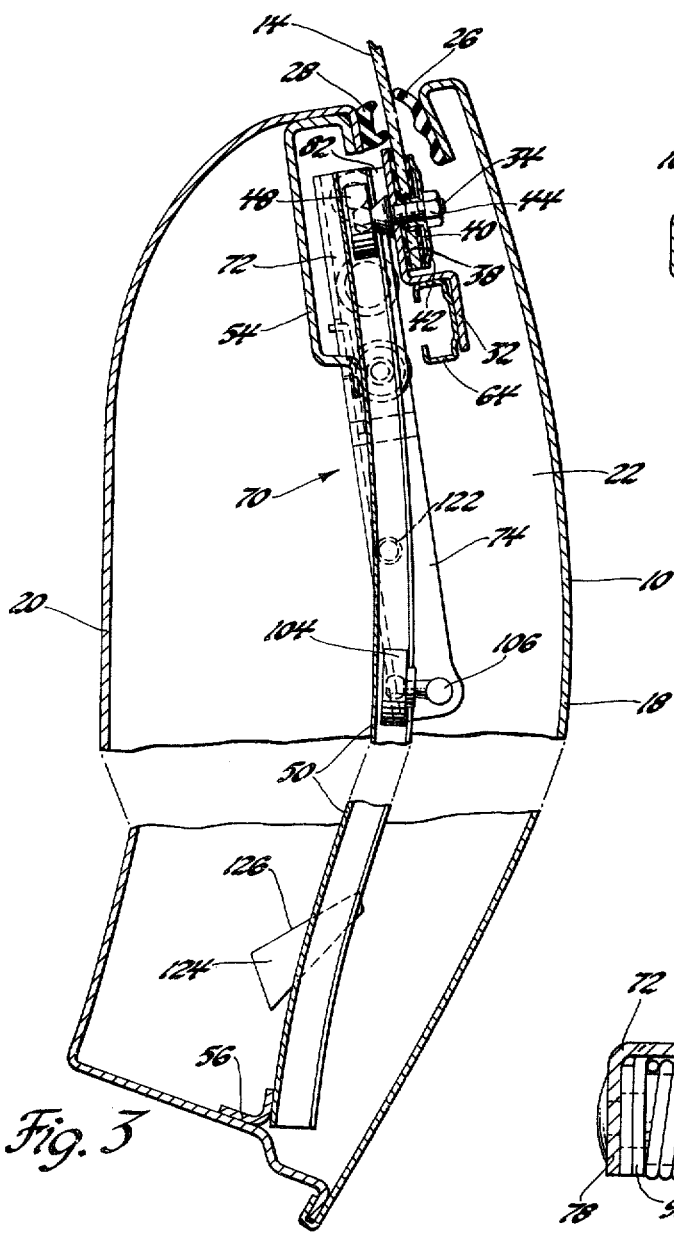
FIG. 3 is a sectional view taken in the direction of arrows 3—3 of FIG. 2.

As best seen in FIG. 3, door 10 includes an outer panel 18 hem flanged to an inner panel 20. The panels are spaced to provide a window storage cavity 22. The outer panel 18 and inner panel 20 have affixed to their upper edge portions respective flexible sealing strips 26 and 28 which bear slidably, but firmly, against the opposite surfaces of the window 14 to provide a weather-tight closure and prevent entry of foreign material into the storage cavity 22 between the outer and inner panels.

Figure 2:
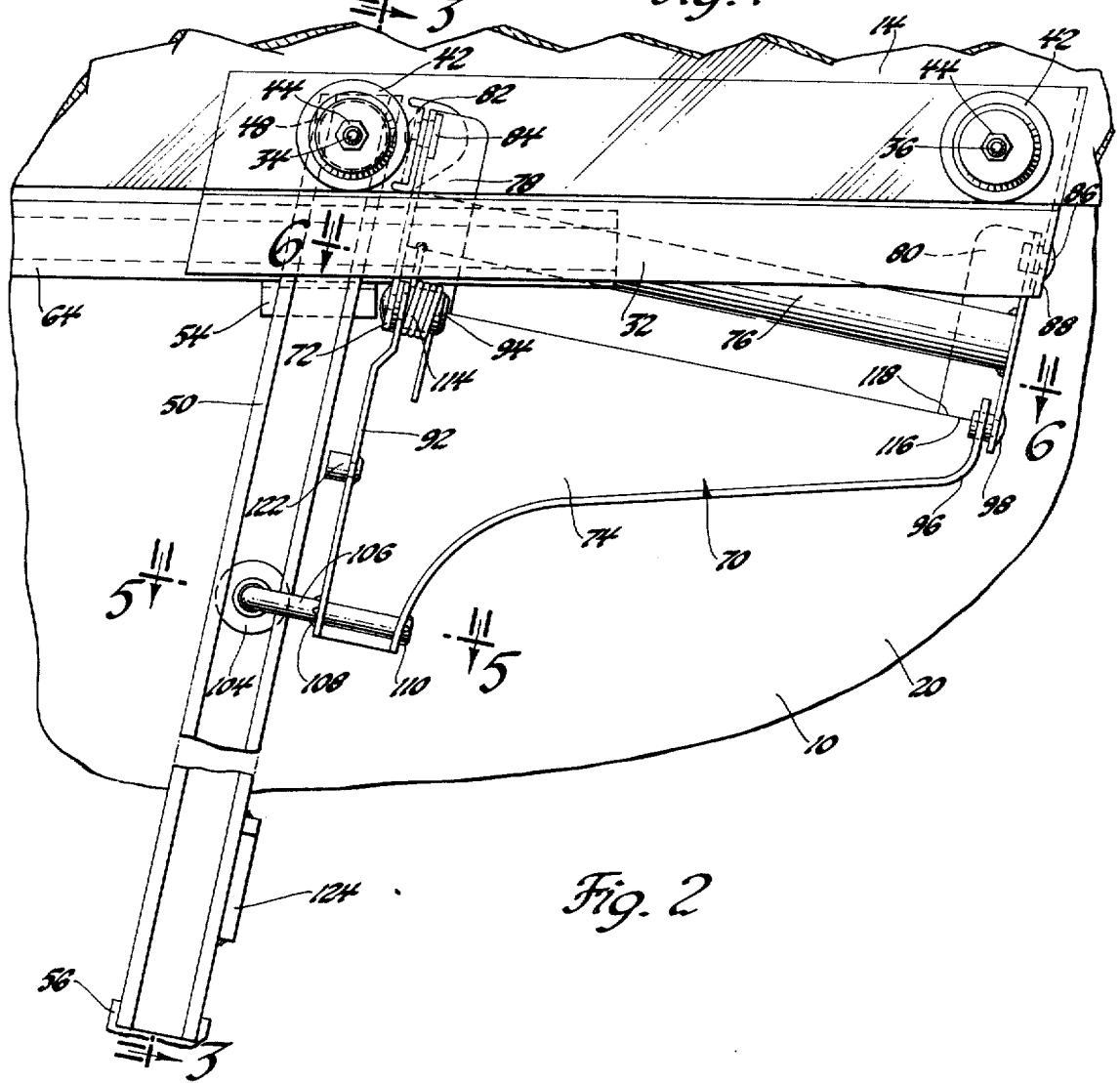
FIG. 2 is an enlarged fragmentary view similar to FIG. 1.

Referring to FIGS. 2 and 3, a sash plate 32 is fixedly secured to the lower edge portion of the window panel 14 by fasteners such as bolts 34 and 36. Each of the bolts has a washer 38 of hard rubber or fiber interposed between the sash plate 32 and window 14 while a similar washer 40 is interposed between a metal washer 42 and nut 44 which attaches the bolts 34 and 36 to the window. The washers 38, 40 and 42 distribute the attaching force of the bolt over a sufficient area of the window to prevent undue distress thereon and also insulate the window 14 from shock loads on the sash plate 32.

As best seen in FIG. 3, a roller 48 is rotatably and universally mounted on the head of bolt 34. Roller 48 is captured in a track 50 and rolls therein. The track 50, as best seen in FIGS. 2 and 3, is mounted generally vertically within the storage cavity 22 of the door 10 by a bracket 54 at its upper end and a bracket 56 at its lower end. The window is lowered and raised by a lift arm 58 which is pivoted about its forward end 60 by a conventional crank assembly 62. A conventional roller, not shown, is mounted on the rearward end of the lift arm 58 and rides in a channel-shaped track 64 which is attached as by welding to the sash plate 32. It will be apparent that when the crank assembly 62 is operated, lift arm 58 is rotated about its forward end 60 and the roller of the lift arm will ride in the track 64 to move the window 14 along a path defined by the movement of roller 48 in the track 50.

Figure 4:
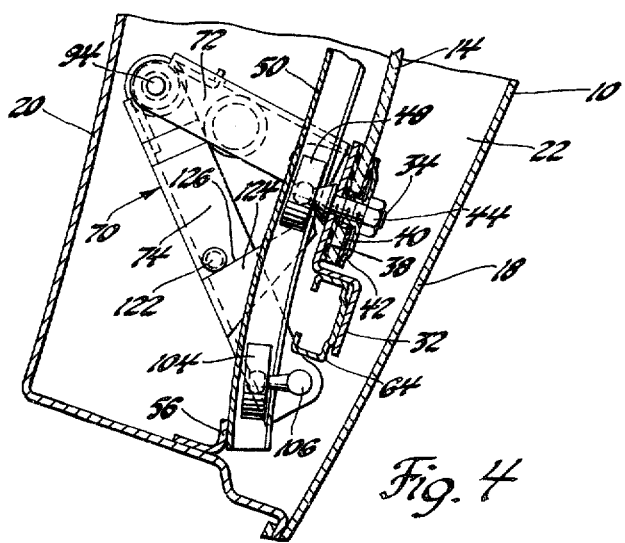
FIG. 4 is a view similar to FIG. 3 but showing the window in the lowered position.

A folding stabilizer linkage, generally indicated at 70 is provided to stabilize the window 14 in the raised position of FIGS. 2 and 3 and to stabilize the window to a lesser extent in the lowered position of FIG. 4. The folding stabilizing linkage includes an upper stabilizer link 72 and a lower stabilizer line 74. The upper stabilizer link 72 includes a rod 76 having its ends respectively welded to one leg of L-shaped brackets 78 and 80. The upper portion of the one leg of the forward bracket 78 is pivotally attached to a laterally extending tab 82 of sash plate 32 by a rivet 84. The one leg of the rearward bracket 80 has its upper portion pivotally attached by a rivet 86 to a laterally extending tab 88 of the sash plate 32.

Figure 5:
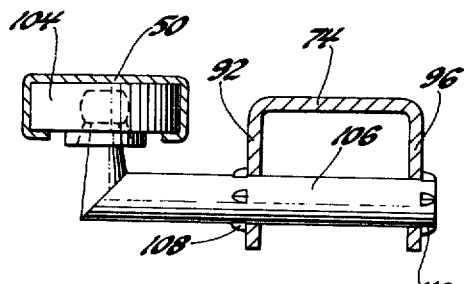
FIG. 5 is a sectional view taken in the direction of arrows 5—5 of FIG. 2.
Figure 6:
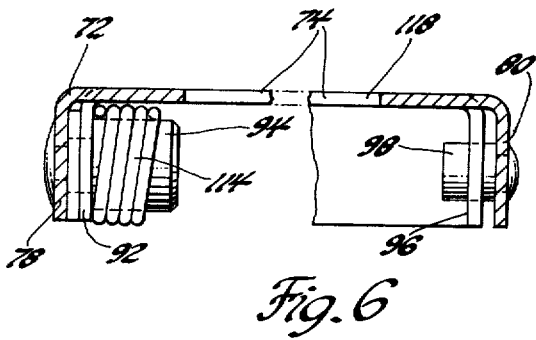
FIG. 6 is a sectional view taken in the direction of arrows 6—6 of FIG. 2.

The lower stabilizer link 74 is pivotally attached to the upper stabilizer link 72. A laterally extending flange 92 of the lower stabilizer link 74 is pivotally attached to the lower portion of the one leg of bracket 78 by a rivet 94. The rearward end of lower stabilizer link 74 is pivotally attached at its laterally extending flange 96 to the lower portion of the one leg of bracket 80 by a rivet 98. As best seen in FIGS. 2 and 5, the lower end of lower stabilizer link 74 is connected to the track 50 by a roller 104 mounted on a shaft 106. The shaft 106 extends through aligned holes in the flanges 92 and 96 of the lower stabilizer link 74 and is captured therein by deforming the shaft at 108 and heading the shaft at 110 so that the lower stabilizer link 74 is pivotable about the shaft 106.

A torsion spring 114 encircles rivet 94 and acts between the other leg of bracket 78 of upper stabilizer link 72 and the lower stabilizer link 74 to urge the stabilizer links into the straight line relationship of FIGS. 2 and 3 defined by the abutment of surface 116 of bracket 80 with the surface 118 of lower stabilizer link 74. It will be apparent that when the upper and lower stabilizer links are in their straight line relationship of FIGS. 2 and 3, the window 14 is supported at its forward end by the roller 48 and at its rearward end by the roller 104 through the rod 106, lower stabilizer link 74, and upper stabilizer link 72. It will be apparent that the stabilizing effect provided by the folding stabilizer linkage 70 is directly proportional to the vertical distance between rollers 48 and 104 and the longitudinal distance between track 50 and the rearward attachment of the stabilizer linkage 70 to the sash plate 32 at rivet 86.

A cam and cam follower arrangement is provided to cause the folding stabilizer linkage to fold when the window is lowered. The cam follower is provided by a rivet 122 mounted on flange 92 of the lower stabilizer link 74 as best seen in FIG. 2. A cam plate 124 is attached as by welding to the side of the track 50 and has a cam surface 126 which slants inwardly of the vehicle body as best seen in FIGS. 3 and 4. As the window 14 is lowered from its raised position of FIGS. 2 and 3 to its lowered position of FIG. 4, the rivet 122 engages the cam surface 126 causing the lower stabilizer link 74 to be pivoted laterally about shaft 106. The pivotal connection of rivets 94 and 98 in turn causes the upper stabilizer link 72 to be pivoted laterally inwardly about the rivets 84 and 86. Spring 114 yields as the stabilizer linkage folds laterally inwardly to its position of FIG. 4. When the stabilizer linkage is folded, the position of the window 14 will be stabilized to a lesser extent than when the window is raised by virtue of the decreased distance between rollers 48 and 104.

The folding of the stabilizer linkage as seen in FIG. 4, permits the lower edge of the window 14 to be lowered into close proximity to the bottom of the storage cavity 22. Accordingly the invention provides a stabilized window and yet maximizes utilization of the storage space so that the sill height of the vehicle body may be relatively low so as to provide an eye-pleasing body style and give an impression of roominess to the passenger compartment of the vehicle.

What is claimed is:

1. In a vehicle body having a window opening, a window movable between raised and lowered positions with respect to the opening, guide means connected to the window and movably mounting the window on the body and defining the path of window movement, and operating means for so moving the window along the path of movement, a stabilizer linkage comprising: track means mounted on the vehicle body within the storage cavity and extending generally vertically, means slidably interengaged with the track means, foldable linkage means having one end pivotally connected to the means slidably interengaged with the track means and the other end pivotally connected to the window at a point longitudinally spaced from the connection between the window and the guide means, means urging the foldable linkage to a normal unfolded position stabilizing the window, and means acting to fold the foldable linkage as the window is lowered to permit increased lowering of the window.

2. In a vehicle body having a window opening, a window movable between raised and lowered positions with respect to the opening, and operating means for so moving the window, guide track means mounted on the body, and first means slidably interengaged with the track means and connected to the window to define the path of window movement upon operation of the operating means, a stabilizer linkage comprising:

an upper stabilizer link pivotally connected to the window in longitudinally spaced relation from the first means slidably connecting the window to the guide track means, a lower stabilizer link having one end pivotally connected to the upper stabilizer link, second means slidably connecting the other end of the lower stabilizer link to the track means and being vertically spaced on the track means from the first means, means urging the upper and lower stabilizer links to a normal position maximizing the vertical spacing between the first and second means to stabilize the position of the window, and cam means acting between the track means and one of the stabilizer links to pivot the upper stabilizer link about its pivotal connection to the window and pivot the lower stabilizer link about the second means to thereby decrease the vertical spacing between the first and second means to permit substantial lowering of the window.

3. In a vehicle body having a window opening, a window movable between raised and lowered positions with respect to the opening, and operating means for so moving the window, guide track means mounted on the body and defining the path of window movement, and first means slidably interengaged with the track means and connected to the window to move the window along the path defined thereby upon operation of the operating means, a stabilizer linkage comprising:

second means slidably interengaged with the guide track means, a first link having one end pivotally attached to the window in longitudinally spaced relation from the first means, a second link having one end pivotally connected to the other end of the first link and the other end pivotally connected to the second means, abutment surfaces on first and second links engageable to define a normal straight line relationship between the first and second links maximizing the vertical spacing between the first and second means, spring means acting between the first and second links to urge the first and second links to the normal straight line relationship to thereby support and stabilize the window, a cam means on the guide track means having an inclined surface, and cam follower means on one of the links engageable with the inclined surface of the cam means when the window is lowered whereby the first and second links are moved from their normal straight line position to decrease the vertical spacing between the first and second means to permit further lowering movement of the window and first means while the second means remains substantially stationary and the links pivot and fold.

* * * * *